(12) United States Patent
Bostrom et al.

(10) Patent No.: US 7,146,129 B2
(45) Date of Patent: Dec. 5, 2006

(54) REMOTE CONTROL OF FUNCTIONS VIA WIRELESS TRANSMISSION OF TEXT-BASED MESSAGES

(75) Inventors: Kevin L. Bostrom, Naperville, IL (US); Gerald W. Pfleging, Batavia, IL (US); Rachel M. Pfleging, Batavia, IL (US); George Paul Wilkin, Bolingbrook, IL (US)

(73) Assignee: Lucent Technologies Inc., Murray Hill, NJ (US)

( * ) Notice: Subject to any disclaimer, the term of this patent is extended or adjusted under 35 U.S.C. 154(b) by 586 days.

(21) Appl. No.: 10/617,073

(22) Filed: Jul. 10, 2003

(65) Prior Publication Data

US 2005/0009511 A1 Jan. 13, 2005

(51) Int. Cl.
*H04H 1/00* (2006.01)
*H04M 3/00* (2006.01)
*H04M 3/42* (2006.01)
*H04B 1/06* (2006.01)
*H04Q 7/20* (2006.01)
*B60R 25/10* (2006.01)

(52) U.S. Cl. ............... 455/3.03; 455/419; 455/420; 455/414.1; 455/352; 455/466; 340/426.13; 340/426.14; 340/426.15

(58) Field of Classification Search .. 455/456.1–456.3, 455/3.02–3.03, 404.1, 404.2, 410, 557, 412.1, 455/414.1, 418–420, 423–425, 456.5, 456.6, 455/466, 517, 550.1, 552.1, 556.1–556.2, 455/79, 563, 569.2, 352–354; 340/426.1, 340/426.2, 426.28, 988–990, 992–993, 539.1, 340/539.11, 539.32, 426.13, 426.14, 825.69, 340/825.72, 3.3–3.32, 3.5, 3.9, 5.1, 5.33, 340/426.15, 825.22; 701/2; 379/74–75, 379/102.01, 102.02, 106.01

See application file for complete search history.

(56) References Cited

U.S. PATENT DOCUMENTS

| | | | | |
|---|---|---|---|---|
| 5,396,540 A | * | 3/1995 | Gooch | 455/456.3 |
| 5,587,715 A | * | 12/1996 | Lewis | 342/357.03 |
| 5,880,732 A | * | 3/1999 | Tryding | 715/810 |
| 6,028,537 A | * | 2/2000 | Suman et al. | 340/988 |
| 6,662,023 B1 | * | 12/2003 | Helle | 455/558 |
| 6,757,530 B1 | * | 6/2004 | Rouse et al. | 455/412.1 |
| 6,816,090 B1 | * | 11/2004 | Teckchandani et al. | 340/989 |
| 6,873,824 B1 | * | 3/2005 | Flick | 455/41.2 |
| 7,013,154 B1 | * | 3/2006 | Nowlan | 455/466 |
| 2003/0092383 A1 | * | 5/2003 | Moles et al. | 455/456 |
| 2004/0041691 A1 | * | 3/2004 | Kapolka | 340/5.64 |

* cited by examiner

*Primary Examiner*—Meless Zewdu

(57) ABSTRACT

A remote control device is located in an environment proximate to conditions to be monitored and actions to be implemented. The remote control device is able to receive and transmit wireless text based communications. A user employing a wireless communication device that supports text based messaging can transmit a control message containing a predetermined command to the remote control device. After preferably authenticating the user, the remote control device initiates a predetermined action based on receipt of a corresponding command.

17 Claims, 3 Drawing Sheets

REMOTE CONTROL OF FUNCTIONS VIA WIRELESS TRANSMISSION OF TEXT-BASED MESSAGES

BACKGROUND

This invention is directed to providing users of wireless communication devices with the capability of controlling functions and sensing conditions present at remote locations by transmitting and receiving text-based messages.

Various types of techniques have been devised for permitting users to remotely control functions. User operable switches located at a user's location have been connected by wires to relays and solenoids at a remote location that are in turn connected to electrically controllable devices. Dedicated wireless transmitter and receiver pairs have been utilized to replace the wires and provide the user with the ability to remotely control devices while moving within the signal transmission range of the transmitter/receiver set. Home security systems also utilize wireless technology to permit users to wirelessly turn on lights and activate/deactivate the security system.

Wireless telephones have continued to evolve. Wireless cellular telephones are now prevalent in most developed countries throughout the world. In addition to providing subscriber voice communications, various types of text-based messaging, such as short messaging system (SMS) messages, are now supported on many of the wireless cellular systems. This permits users in compatible wireless systems to send character based messages to each other. Some cellular systems permit a subscriber to send an SMS message addressed to an Internet protocol (IP) address so that such messages can be received on a user's computer with an Internet connection.

Although wireless communication technology has continued to make advancements, users have been generally limited to utilizing special-purpose devices for the remote control of functions. Thus, there exists a need to provide users with an improved remote control capability that can be accomplished from a subscriber communication device.

SUMMARY OF THE INVENTION

It is an object the present invention to provide users with an improved remote control capability utilizing text-based messaging available on wireless telephony devices.

In accordance with an embodiment of the present invention, a remote control device is located in an environment proximate to conditions to be monitored and actions to be implemented. The remote control device is able to receive and transmit wireless text based communications. A user employing a wireless communication device that supports text based messaging can transmit a control message containing a predetermined command to the remote control device. After preferably authenticating the user, the remote control device initiates a predetermined action based on receipt of a corresponding command.

DETAILED DESCRIPTION

Figure 1:
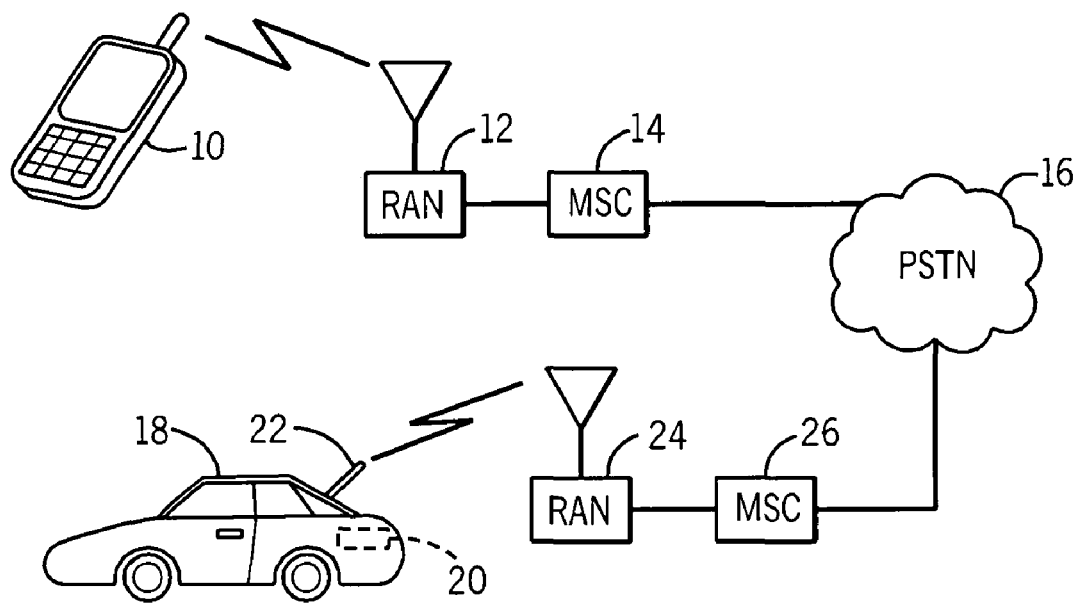
FIG. 1 is a block diagram of a telecommunications system suited for incorporating an embodiment of the present invention.

In FIG. 1, a wireless communication device 10, such as a cellular telephone with SMS text messaging capability, is supported by a wireless radio access node (RAN) 12. A mobile switching center (MSC) 14 supports wireless communications for devices supported by RAN 12 and is coupled to the public switched telephone network (PSTN) 16. An automobile 18 contains a wireless remote control device 20 that includes an antenna 22. Wireless communications with the remote control device 20 is supported by RAN 24. A MSC 26 supports communications by RAN 24 and is coupled to the PSTN 16.

Figure 2:
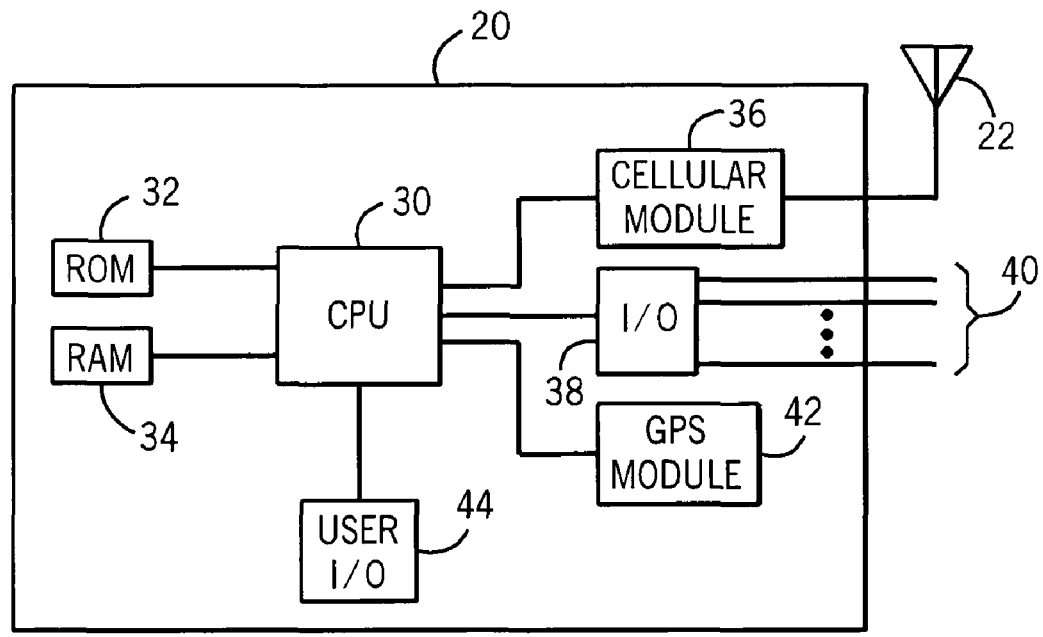
FIG. 2 is a block diagram of an apparatus for receiving text-based control messages in accordance with an embodiment of the present invention.

FIG. 2 is a block diagram of an exemplary wireless remote control device 20. A central processing unit (CPU) 30 is coupled to and supported by read-only memory (ROM) 32 and random access memory (RAM) 34. The CPU 30 operates under the control of program instructions initially stored in ROM 32 and stored during active operation in RAM 34. A cellular communications module 36 is coupled to antenna 22 and to CPU 30. The module 36 provides a radio frequency (RF) interface providing cellular based communications between device 20 and the cellular infrastructure system. An input/output (I/O) module 38 provides an interface between input and output signals carried by lines 40 and the CPU 30. In the illustrative embodiment the lines 40 are coupled to various functions associated with the automobile 18 such as electronic door locks, activation of the horn and/or headlights, arming/disarming of a security system, temperature sensor of the automobile's interior, etc. A global positioning satellite (GPS) module 42 is coupled to CPU 30 and provides the CPU with location coordinates of the automobile. A user I/O module 44 facilitates input and output interaction between the user and CPU 30 and may include a keypad including function control buttons for providing input to the CPU, alphanumeric character entry keys, and a display screen for providing output to the user.

The remote control device 20 may consist of a general or special purpose computer. With more computing functions being deployed within automobiles, remote control device 20 could be integrated into an existing computer device deployed to support other functions. The cellular module 36 may comprise a wireless modem capable of cellular communications or could comprise a stand-alone cellular handset that supports a cable or other communication mechanism for transferring command signals, status information, and character based information between the cellular handset and CPU 30. Although described for operation with a cellular system, it will be apparent that wireless systems of other than cellular format could be used to convey text based messages.

Figure 3:
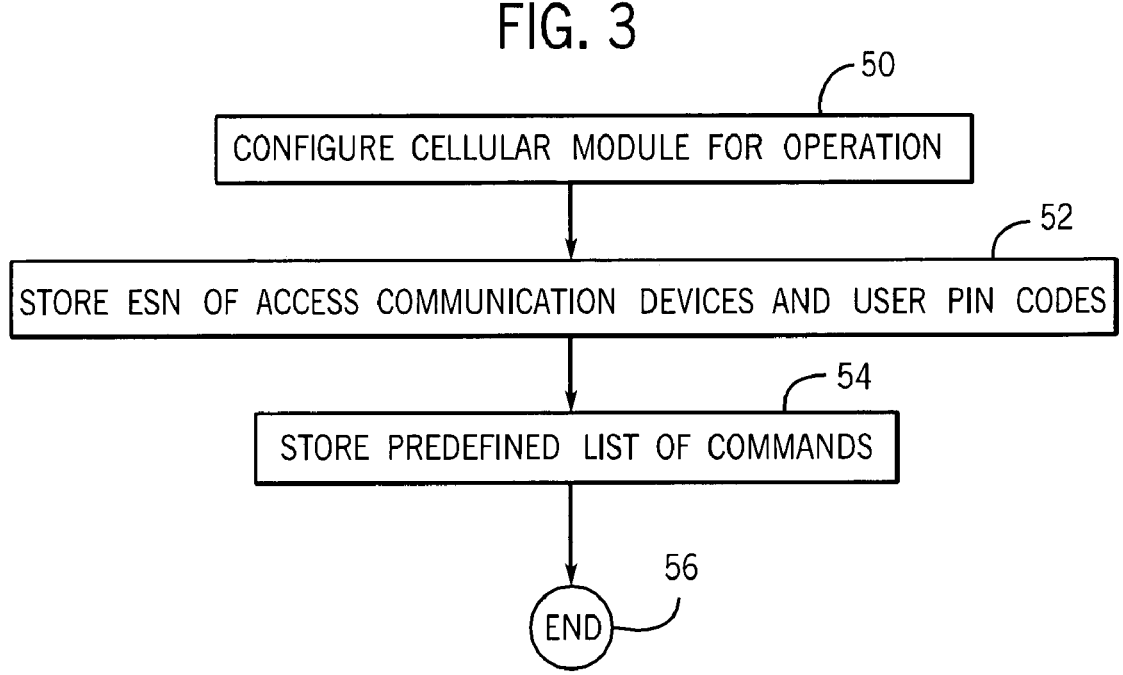
FIG. 3 is a flow diagram illustrating initialization of the remote control device in accordance with an embodiment of the present invention.

FIG. 3 illustrates an initiation of the remote control device 20. In step 50 the cellular module 36 is configured for operation, i.e. any required assignments of conventional operational information or parameters are completed such as storing a cellular telephone number and registering with a cellular service provider. In step 52 the electronic serial numbers (ESN) of the communication devices authorized for transmitting commands to the remote cellular device are input and stored for later use in authenticating a request to enter commands for the remote control device. Likewise, personal identification number (PIN) codes, if used to provide further authentication of users, are stored. In step 54 predefined commands are input and stored in the remote control device. Exemplary commands are shown in Table 1 below. This process is concluded at END 56.

TABLE 1

| Command | Optional parameter | Description |
| --- | --- | --- |
| UNLOCK DOORS | 1–9 | Unlocks doors of the vehicle; 1 = opens only driver's door; any other No. opens all doors; default if no parameter sent is open all doors |
| HONK | 1–60 | Causes the horn of the vehicle to periodically honk during the time in seconds specified by the optional parameter; a default value of 5 seconds is used if no parameter is specified |
| TEMP | none | Requests the temperature of the passenger compartment determined by sensor to be transmitted to the user |
| LOCATION | none | Requests the location of the vehicle as determined by GPS coordinates to be transmitted to the user |

Table 1 is substantially self-explanatory. The "commands" are predetermined words and/or phrases such as in ASCII character format. The "optional parameters", if utilized with a specific command, comprise alphanumeric characters that have a specific predefined meaning as defined in the "description" section. For example, the reception of "HONK 5" by the remote control device from an authorized user would cause a signal to be generated resulting in the horn of the subject vehicle periodically honking for five seconds. This command could be useful in helping a user to find a vehicle such as in a large parking lot. The "LOCATION" command enables the user to determine the geographic location of the vehicle; this information is useful in a variety of situations including monitoring the progress of the vehicle towards a destination and assisting in locating the vehicle should the vehicle be stolen. Preferably the user's communication device 10 is able to display a map on its screen showing the location of the vehicle as determined by the received coordinates. Alternatively, device 10 could store the received location coordinates and transmit these coordinates to a separate device capable of determining and displaying the coordinate information on an appropriate map. The illustrated commands are merely exemplary of a variety of commands that could be utilized to remotely control various functions and request information concerning the vehicle (or other apparatus) to be transmitted to the user. It will be apparent that uses for the remote control device are not limited to applications associated with a vehicle.

Figure 4:
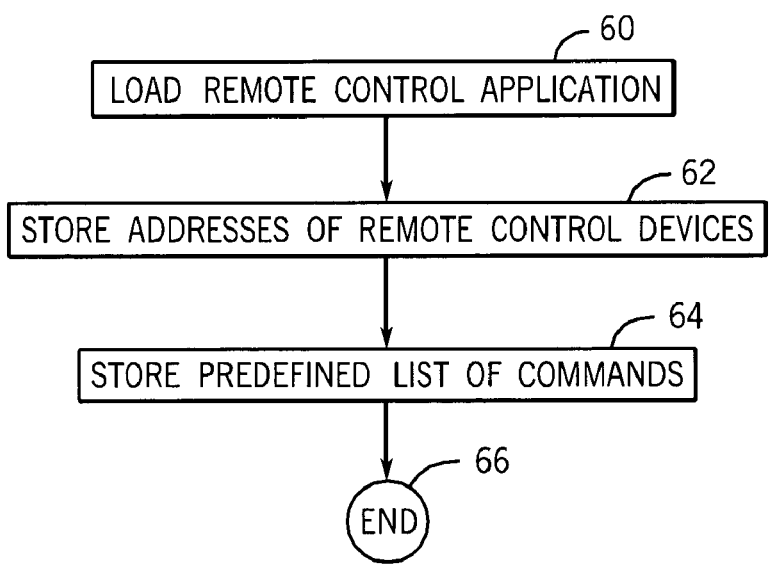
FIG. 4 is a flow diagram illustrating initialization of the user's wireless communication device in accordance with an embodiment of the present invention.

FIG. 4 illustrates an initiation of the wireless communication device 10. In step 60 a remote control software application is preferably loaded in device 10 to assist the user with the identification and transmission of valid commands to the remote control device. For example, the application can display a list of remote control devices, each listed device having an associated stored address, on the display screen of device 10 for selection by the user. A list of commands available to be transmitted to the selected remote control device and associated parameters, if any, can also be displayed on the screen of device 10 for the user's selection. In step 60 to the addresses of remote control devices to be accessed by the user are stored in device 10. In step 64 a predefined list of commands acceptable by the remote control devices are stored in device 10. The initiation process terminates at END 66. Alternatively, if a remote control application is not available in communication device 10, the user can manually input the address of the desired remote control device and manually input a text based command to be transmitted to the remote control device.

Figure 5:
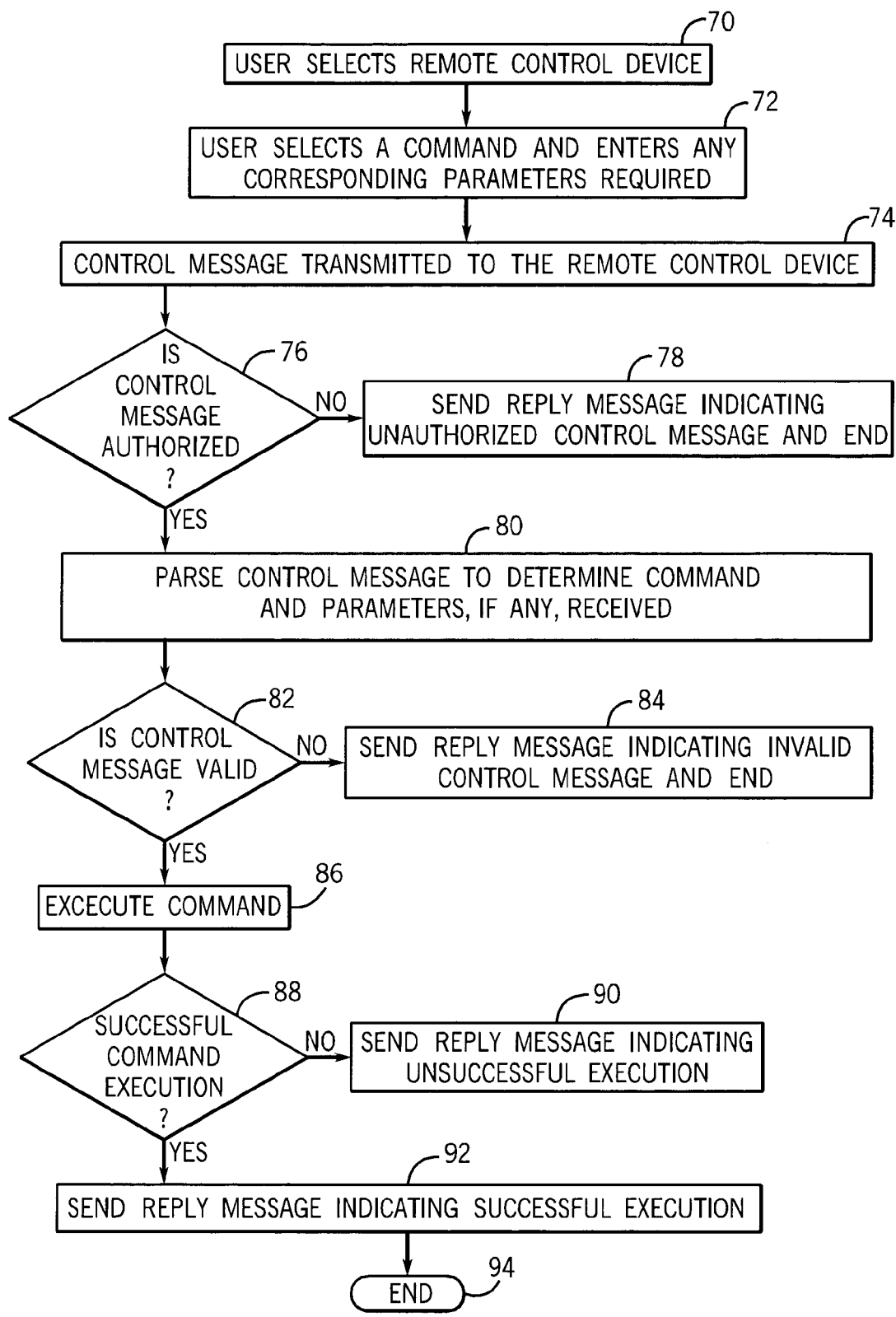
FIG. 5 is a flow diagram illustrating the operation of the remote control device in response to a user command in accordance with embodiment of the present invention.

FIG. 5 illustrates an example of steps practiced in implementing an embodiment of the present invention. In step 70 the user selects a remote control device to which a command is to be directed. This selection may be made by the user selecting the desired remote control device from a list of remote control devices displayed on the screen of the user's wireless device 10. Alternatively, the user can manually enter an address associated with the desired remote control device. In step 72 the user inputs into communication device 10 a desired command and any corresponding parameters, if required. This can be accomplished by the user selecting the desired command from a list of commands displayed on the screen of the user's wireless device 10. If parameters are required for the selected command, the parameters can likewise be selected from a listing displayed for the user. Following the selection of the command and associated parameters, if any, a text based control message containing the command and parameter is transmitted to the selected remote control device 10. Alternatively, the user can manually enter a text based control message containing the command and parameters, if any. In step 74 the control message is transmitted to the remote control device 20 from the user's wireless communication device 10.

In step 76 the remote control device 20 upon receiving the control message determines whether the control message is authorized. Authorization of the user to originate a control message can be based on the received ESN of device 10, a PIN code that was entered by the user and transmitted as part of the control message, or a requirement for both. The ESN of the transmitting device is normally encoded as part of the transmission protocol and could be decoded by cellular module 36 and passed to CPU 30 for use in authentication. As explained in reference to FIG. 3, the ESN's and PIN codes are stored in the remote control device 20 during the initiation process for later use in authenticating the authority of users to transmit a control message. A NO determination results in a reply message being sent to the user indicating that the control message was unauthorized and ending the process.

A YES determination by step 76 results in the control message being parsed in step 80 to identify the command and associated parameters, if any, received by the remote control device 20. If the text based messaging supports messages that have different sections, e.g. a header and a body section, the command and parameters entered by the user will preferably be in a predefined section of the message such as in the header to simplify the parsing process. After identifying the command and parameters received in the control message, a determination is made in step 82 of whether the control message itself is valid. For example, if the received command does not match one of the stored list of predetermined commands in the remote control device, the control message will be determined to be invalid. Upon a NO determination by step 82, a reply message is sent to the user in step 84 indicating the receipt of an invalid control message and the process ends.

A YES determination by step 82 results in the CPU 30 of remote control device 20 executing the received command in step 86. Execution of the command will vary depending on the nature of the command and the action to be taken or the information to be obtained. For a LOCATE command, the CPU 30 would query and obtain the coordinates from the GPS module 42 and return the coordinate information in a text based reply message transmitted to the user. The user's address (the address of device 10) will be known to the remote control device from the previously received control message from device 10. For a "HONK 5" control message, the CPU 30 will send periodic signals by I/O module 38 to a predetermined one of the lines 40 coupled to the vehicle's horn control module causing the horn to honk on and off for a 5 second interval. For a TEMP command, the CPU 30 will read an input by I/O module 38 from one of the lines 40 coupled to a temperature sensor located in the passenger compartment of the subject vehicle, and generate a text based reply message to the user containing the sensed temperature. Execution of the command may involve the CPU 30 communicating with another computer module if the latter controls the subject function or has access to the input associated with the command. The CPU 30 may be connected through a vehicle wiring harness to the other computer module.

In step 88 a determination is made of whether a successful command execution occurred. The CPU 30 may make this determination based on its successful generation of a control signal or based on feedback associated with execution of the function associated with the command. A NO determination results in a reply message being sent to the user indicating an unsuccessful execution of the command in step 90. A YES determination by step 88 causes a reply message to be sent to the user indicating the successful execution of the received command in step 92. This process terminates at END 94.

Various changes and modifications can be made to the embodiment of the present invention. The remote control device can be usefully employed in a variety of environments in addition to a vehicle. For example, it may be desirable to remotely monitor conditions such as temperature, presence of water or other substances, pressure, commercial AC power availability, state of alarms, and to be able to control functions or take actions at the site of the remote control device based on such conditions. The remote control device in conjunction with the text based commands that can be generated from a wireless device provides users with the flexibility of being able to monitor conditions and issue commands regardless of the location of the user. Any text based messaging protocol can be utilized including SMS messaging and IP formats including various types of instant messaging and e-mail. If another wireless protocol is used, it will be apparent to those skilled in the art that a compatible infrastructure will be required to facilitate communications between the wireless communication device of the user and the remote control device. Location techniques other than GPS could be used to determine and communicate the geographic location of the remote control device.

Although an embodiment of the present invention has been described and shown in the figures, the scope of the invention is defined by the claims that follow.

We claim:

1. A method implemented by remote control device for remotely controlling functions and providing status information comprising the steps of:
   storing predetermined text based commands;
   receiving a control message transmitted over a wireless communication channel;
   parsing the control message to identify a first text based command;
   comparing said first text based command with said stored predetermined text based commands to determine if the first text based command is a valid command;
   executing a predetermined control action corresponding to said first text based command if the latter is determined to be a valid command;
   wherein the step of executing a predetermined control action comprises generating a request for information signal, transmitting the request for information signal to an apparatus external to the remote control device, receiving first status information from the apparatus in response to said request for information signal, and transmitting a reply message containing the first status information in text based format to an address from which the control message was received.

2. The method according to claim 1 wherein the step of executing a predetermined control action comprises generating a control signal and transmitting the control signal to a first function controllable by the control signal.

3. The method according to claim 1 wherein the step of receiving a control message comprises receiving a short messaging system message received over a cellular wireless communication channel.

4. The method according to claim 1 wherein the received control message includes a first text based command and an associated first parameter where the first parameter defines a numeric value that is utilized in determining the control action to be executed.

5. The method according to claim 1 further comprising the step of connecting the remote control device to electronic control means in a vehicle, at least a group of said predetermined text based commands having a corresponding control action associated with an operable function of the vehicle.

6. The method according to claim 1 wherein the remote control device includes a means for generating location coordinates, the step of executing a predetermined control action comprising generating a request for location signal, transmitting the request for location signal to the means for generating location coordinates, receiving first location information from said means in response to said request, and transmitting a reply message containing the first location information in text based format to an address from which the control message was received.

7. The method according to claim 1 further comprising the steps of storing authentication information associated with at least one of a first user and a first user's wireless communication device, and utilizing said at least one to determine whether the received control message is valid.

8. The method according to claim 7 wherein the authentication information associated with the first user'wireless communication device comprises an electronic serial number of said device.

9. The method according to claim 1 wherein the generating of the request for information signal is in response to the receipt of the first text based command, and the first status information received by the remote control device was originated by and transmitted from the apparatus.

10. A method for remotely controlling functions and providing status information comprising the steps of:
   storing predetermined text based commands in a remote control device;
   transmitting a text based control message addressed to the remote control device from a cellular telephone;
   upon receipt of said control message at the remote control device, parsing the control message to identify a first text based command;
   determining the validity of the first command based on whether the first command is a match with any of said stored predetermined text based commands;

executing a predetermined control action corresponding to said first text based command by the remote control device upon the first command having been determined to be valid;

wherein the step of executing a predetermined control action comprises generating a request for information signal, transmitting the request for information signal to an apparatus external to the remote control device, receiving first status information from the apparatus in response to said request for information signal, and transmitting a reply message containing the first status information in text based format to the cellular telephone based on an address of the cellular telephone received with the control message.

11. The method according to claim 10 wherein the step of transmitting the control message comprises transmitting a short messaging format message by the cellular telephone, and wherein the step of executing a predetermined control action comprises generating a control signal and transmitting the control signal from the remote control device to an apparatus having a first function controllable by the control signal.

12. The method according to claim 10 wherein the received control message includes a first text based command and an associated first parameter where the first parameter defines a numeric value that is utilized in determining the control action to be executed.

13. The method according to claim 10 further comprising the step of connecting the remote control device to electronic control means in a vehicle, at least a group of said predetermined text based commands having a corresponding control action associated with an operable function of the vehicle.

14. The method according to claim 10 wherein the remote control device includes a means for generating location coordinates, the step of executing a predetermined control action comprising generating a request for location signal, transmitting the request for location signal to the means for generating location coordinates, receiving first location information from said means in response to said request, and transmitting a reply message to the cellular telephone containing the first location information in text based format.

15. The method according to claim 10 further comprising the steps of storing in the remote control device authentication information associated with at least one of a first user and the cellular telephone, and utilizing said at least one to determine whether the received control message is valid.

16. The method according to claim 15 wherein the authentication information associated with the cellular telephone comprises an electronic serial number of the cellular telephone.

17. The method according to claim 10 wherein the generating of the request for information signal is in response to the receipt of the first text based command, and the first status information received by the remote control device was originated by and transmitted from the apparatus.

* * * * *